E. F. ANDREAE.
METHOD OF MAKING STORAGE BATTERY GRIDS.
APPLICATION FILED SEPT. 5, 1916.

1,289,356.

Patented Dec. 31, 1918.
6 SHEETS—SHEET 1.

Edward F. Andreae INVENTOR

BY Thomas Howe ATTORNEY

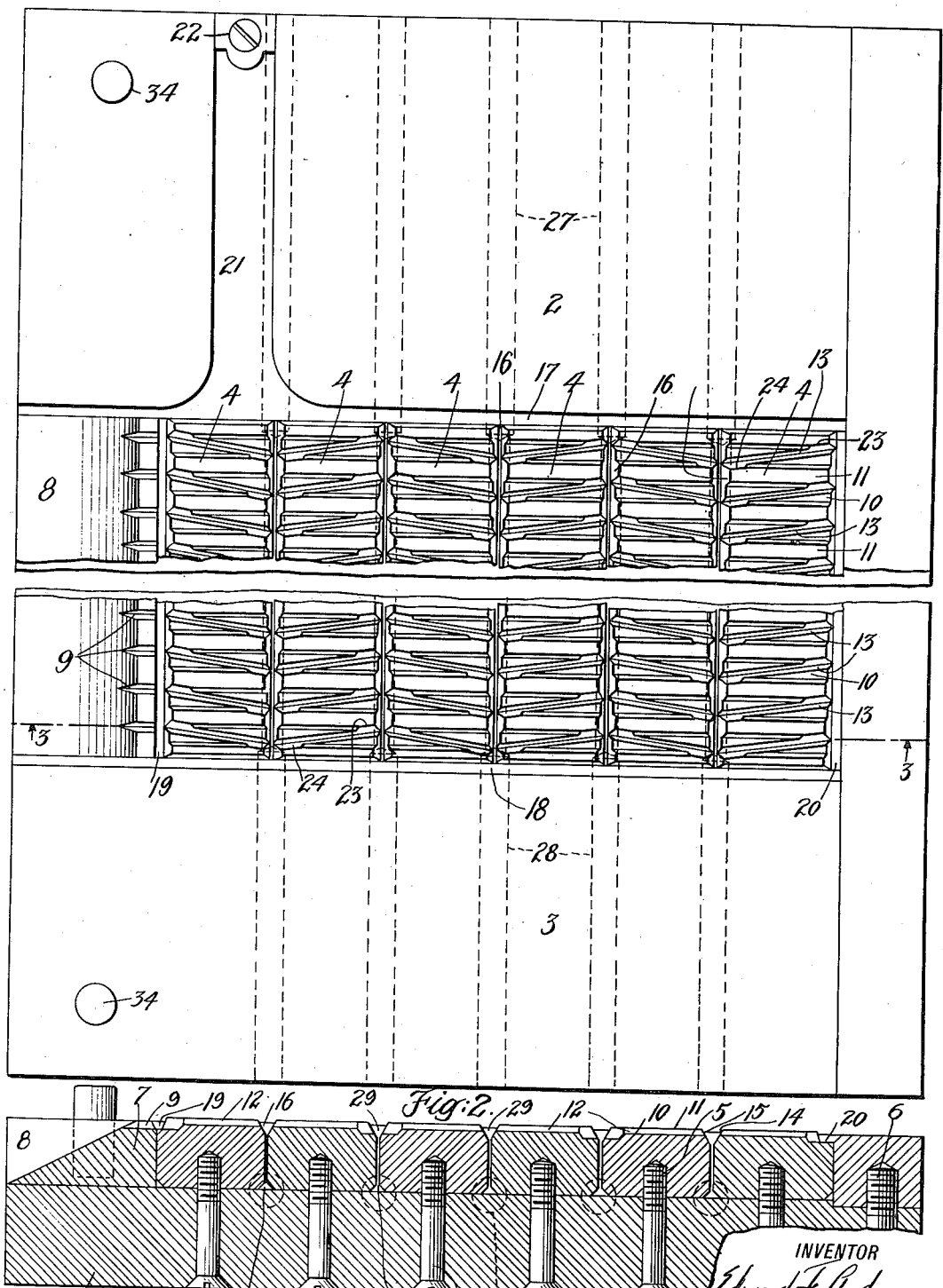

E. F. ANDREAE.
METHOD OF MAKING STORAGE BATTERY GRIDS.
APPLICATION FILED SEPT. 5, 1916.
1,289,356.
Patented Dec. 31, 1918.
6 SHEETS—SHEET 3.
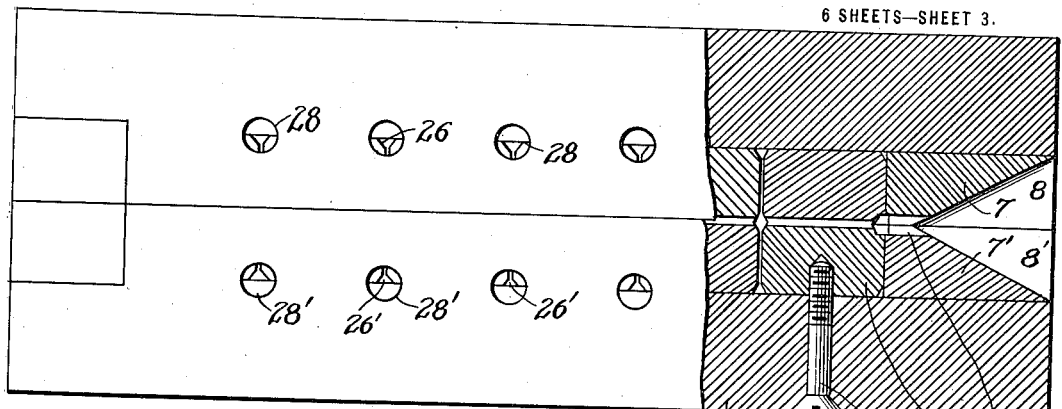
Fig. 8.
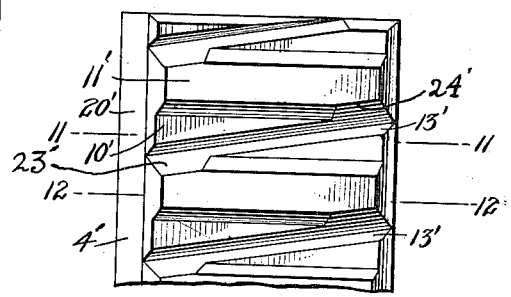
Fig. 7.
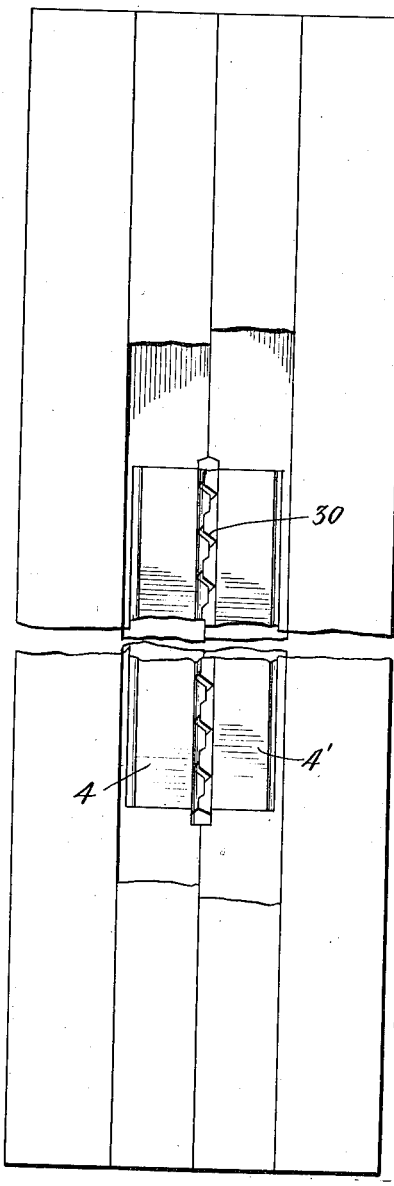
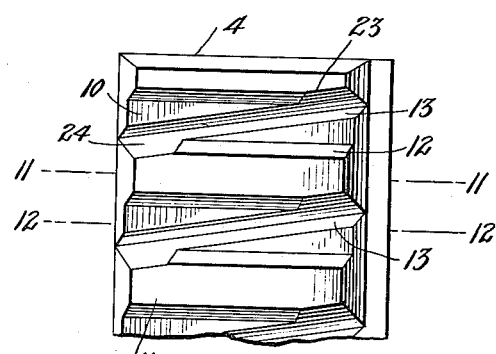
Fig. 4.
Fig. 9.
Edward F. Andreae INVENTOR
BY
Thomas Howe ATTORNEY

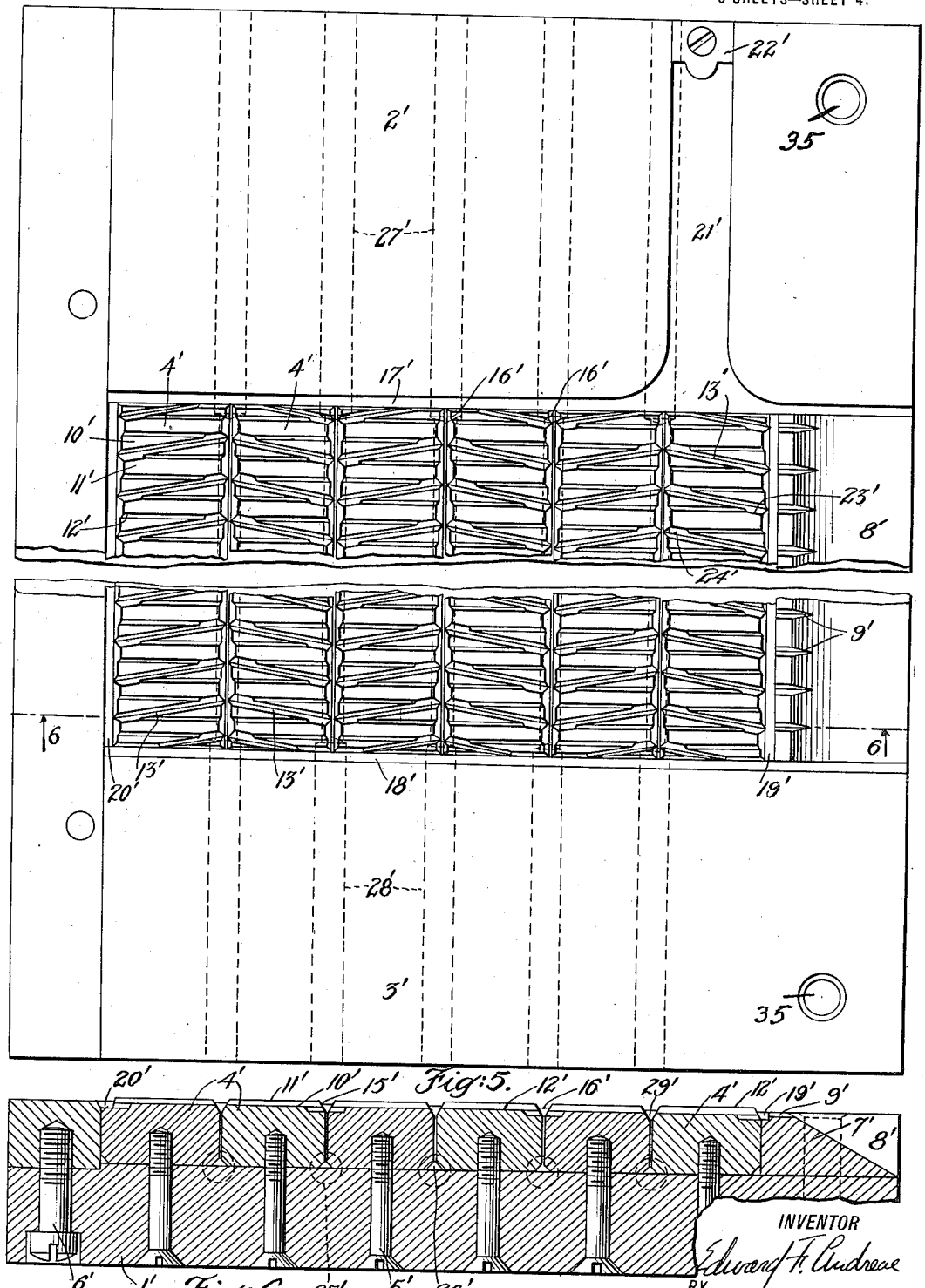

E. F. ANDREAE.
METHOD OF MAKING STORAGE BATTERY GRIDS.
APPLICATION FILED SEPT. 5, 1916.

Patented Dec. 31, 1918.
6 SHEETS—SHEET 5.

Edward F. Andreae INVENTOR

BY Thomas Howe ATTORNEY

E. F. ANDREAE.
METHOD OF MAKING STORAGE BATTERY GRIDS.
APPLICATION FILED SEPT. 5, 1916.
1,289,356.
Patented Dec. 31, 1918.
6 SHEETS—SHEET 6.
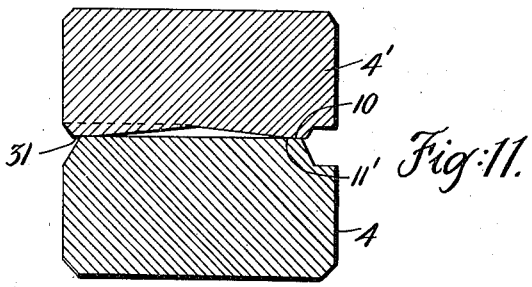
Fig. 11.
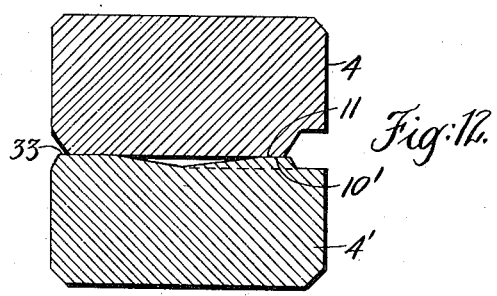
Fig. 12.
Fig. 13.
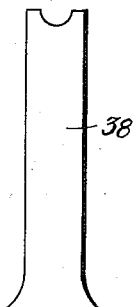
Fig. 14.
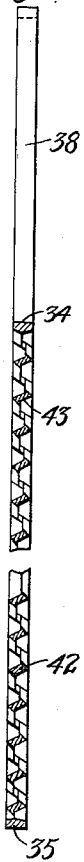
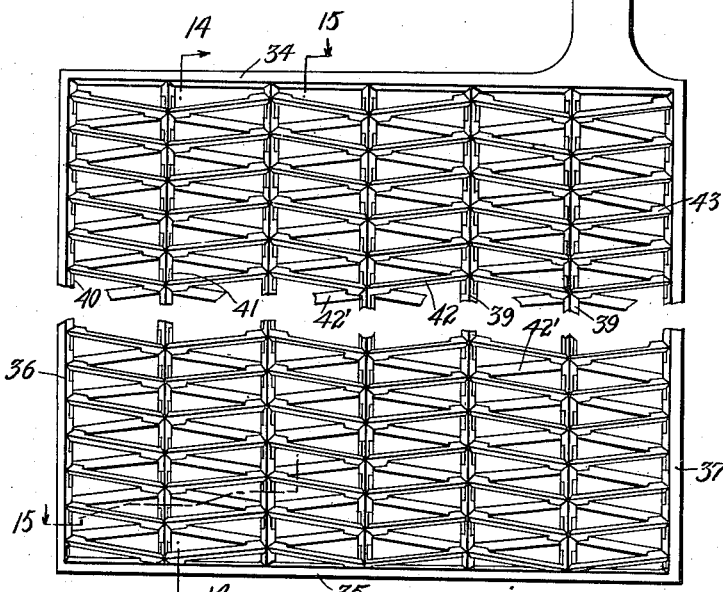
Fig. 15.
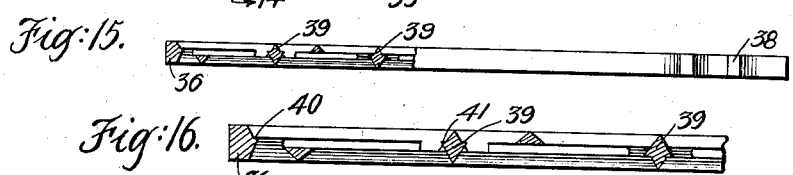
Fig. 16.
INVENTOR
Edward F. Andreae
BY
Thomas Howe ATTORNEY

UNITED STATES PATENT OFFICE.

EDWARD F. ANDREAE, OF NEWARK, NEW JERSEY, ASSIGNOR TO GENERAL LEAD BATTERIES COMPANY, A CORPORATION OF DELAWARE.

METHOD OF MAKING STORAGE-BATTERY GRIDS.

1,289,356.   Specification of Letters Patent.   Patented Dec. 31, 1918.

Application filed September 5, 1916. Serial No. 118,563.

*To all whom it may concern:*

Be it known that I, EDWARD F. ANDREAE, a citizen of the United States, residing at Newark, in the county of Essex and State of New Jersey, have invented certain new and useful Improvements in Methods of Making Storage-Battery Grids, of which the following is a specification.

This invention relates to processes for making storage battery grids.

More particularly it relates to the formation of double lattice grids.

No attempt is made herein to claim the apparatus for forming a grid, such claims being made in my co-pending application Serial Number 110,494.

An object of the invention is to simplify and render less expensive the operation of manufacturing such grids.

A further object of the invention is to provide a process whereby a stronger and more efficient grid may be formed.

A further object of the invention is to provide a process which may be carried out by a simpler apparatus than that heretofore employed.

Other an ancillary objects of the invention will appear hereinafter.

In the accompanying drawings which illustrate an apparatus by which the invention may be carried out and a product formed in accordance therewith, Figure 1 is a side elevation of a machine for handling the mold parts;

Fig. 2 is an elevation, broken away at the center, of the mold face of one of the mold halves;

Fig. 3 is a section on the line 3—3 of Fig. 2;

Fig. 4 is an enlarged view of a portion of the mold face of Fig. 2;

Fig. 5 is a view similar to Fig. 2 of the mold face of the other half;

Fig. 6 is a section on the line 6—6 of Fig. 5;

Fig. 7 is an enlarged view similar to Fig. 4 of a portion of the mold face of Fig. 5;

Fig. 8 is an end elevation partly broken away of the two mold parts together in position for molding;

Fig. 9 is a bottom plan view of the structure of Fig. 8 partly broken away to show the edge of the mold faces;

Fig. 11 is a section through a projection and its coöperating depression when the mold faces are together; this view being on the same scale as Figs. 4 and 7, and being on the lines 11—11 of the devices of those figures when they are together;

Fig. 12 is a view similar to Fig. 11 on the lines 12—12 of Figs. 4 and 7;

Fig. 13 is a side elevation of the grid formed on a scale reduced from that of the mold;

Fig. 14 is a section on the line 14—14 of Fig. 13;

Fig. 15 is a view on the line 15—15 of Fig. 13, looking in the direction of the arrows, being partly in section; and Fig. 16 is an enlarged view of the sectional portion of Fig. 15.

Figure 1:
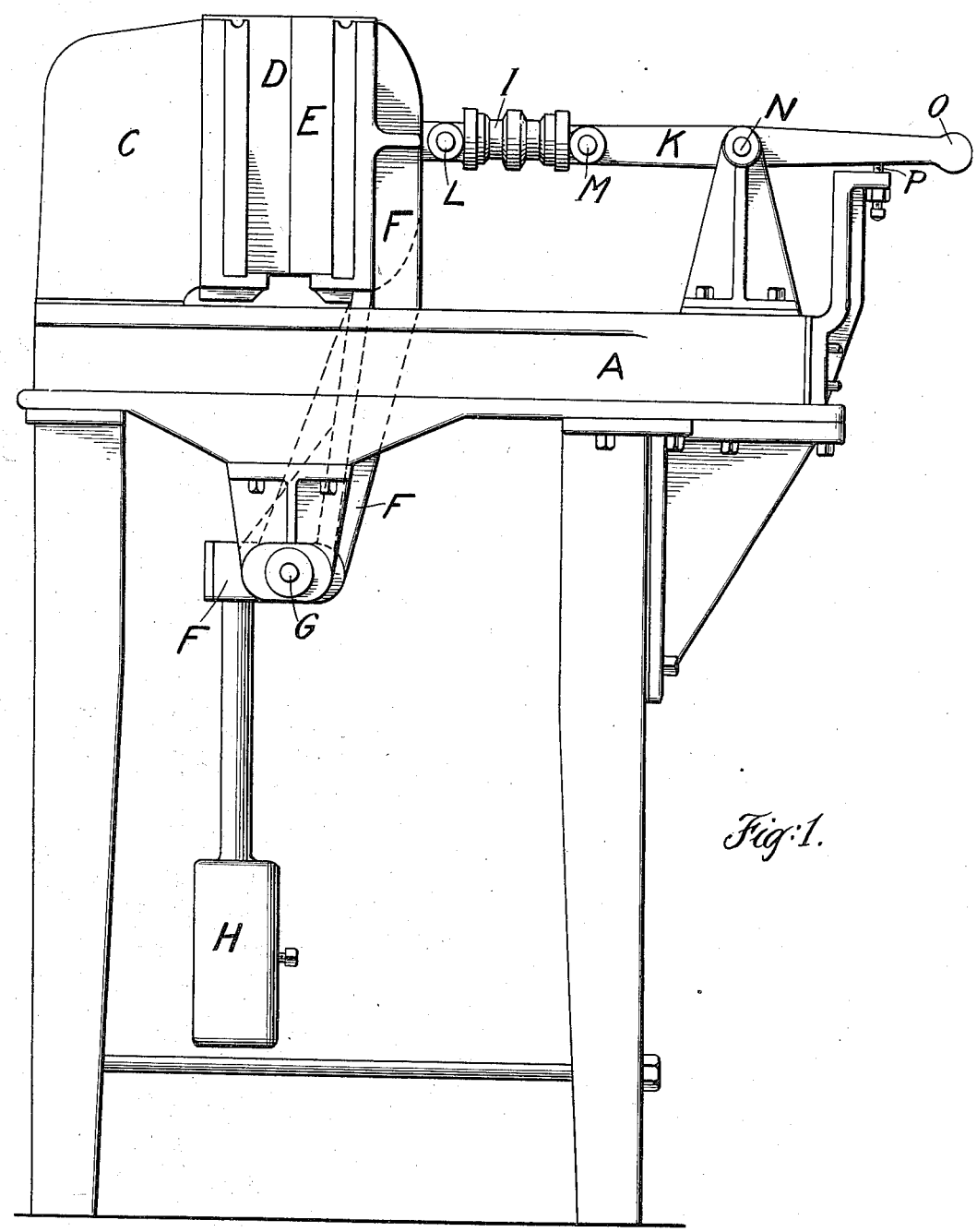

Referring to the drawings, and first to Fig. 1, the apparatus for mounting and operating the mold may consist of the frame A upon which is a head C carrying the stationary part of the mold. The mold is in two parts D and E, one of them being carried on the head C and the other in a bracket F pivoted to the frame at G and having a counter weight H. The mold sections are operated by the toggle comprising the links I and K, the former being pivoted to the bracket F at L and to the link K' at M. The link K is also pivoted to the frame at N and is extended beyond the same to the handle O. Downward movement of the handle is limited by an adjustable stop P. Also the length of the link I may be made adjustable by having its central portion secured in its extremities by reverse screw threads after the manner of a turn buckle so that the mold parts will be held in proper relative positions.

With the parts in the position shown, the mold parts are together so that the molten metal (that of storage battery grids is usually antimonious lead) may be poured into the mold. Usually the mold parts are heated by gas flames or other suitable means to prevent quick chilling of the metal which would interfere with its flow through the small passages. The whole may be built of metal, and as is well known in connection with castings of this character, the metal of which the mold is formed is usually iron.

On lifting the handle O the mold parts separate so that the grid can be removed and after such removal the mold may be again closed by depressing the handle.

One of the mold parts D and E is shown in Figs. 2, 3 and 4, and comprises a plate 1 having a channel cut through it from side to side leaving the outstanding end heads 2 and 3. Within the channel are fitted strips 4 having grid forming passages. A sufficient number of these strips to give the desired size are laid side by side and secured to the plate 1 by screws 5. One end of the channel in the plate is closed by a bar secured to the plate by screws 6 and the other end is similarly closed by a bar 7 having a recess 8 tapering inwardly as shown for the entrance of the poured metal and communicates by grooves 9 with the grid forming passages. Each strip has a series of faces as 10 in substantially the same plane alternating with faces as 11 in another plane, the latter faces being on projections 12 extending from the strip and so being elevated above the faces 10 which are relatively depressed. The distance between the planes of the two sets of faces, i. e. the height of the projections, is equal to the thickness of the space desired between the two lattices.

The elevated faces 11 are plane while in the faces 10 are inclined grooves 13 for forming the bars of a grating or lattice, these grooves being V shaped in section and extending from one side of the strip to the other. The corners of the strips at the ends of the grooves 13 are beveled as at 14 so that, with the beveled faces as 15 of adjacent strips, grooves 16 of V shaped section are formed into which the grooves 13 open and which open at their ends into the channel 17 for forming the top of the peripheral frame of the grid and the channel 18 for forming the bottom of the grid frame. Extending between and opening into the channels 17 and 18 are the channels 19 and 20 for forming the side bars of the marginal frame of the grid. The adjacent lattice bar grooves open into the channels 19 and 20 and the pouring grooves 9 open into the former channel. A channel 21 for forming the terminal lug of the grid is cut in the end head 2 and opens into the channel 17, the outer end of the channel 21 being stopped by a plug 22 the top of which is flush with the surface of the head 2.

The grooves 16 are for forming partitions extending between the two lattices and have their bottoms in substantially the same plane as the bottoms of the grooves 13 for forming the lattice bars and the channels 17, 18, 19 and 20 for forming the peripheral frame of the grid.

The grooves 13 are so inclined that the corners as 23 and 24 of the projections 12 at the ends of the grooves are cut away and, it will be observed, the strip faces are made up of duplicate sections each consisting of a depressed and an elevated face with grooves and bevels as described. This is clearly shown in the enlarged view of Fig. 4 showing the upper end of the right hand strip of Fig. 2. The strip is made of any length desired by multiplying the sections with the elevated and depressed faces in alternation. The sides of the projections 12 are preferably made inclined to facilitate manufacture and to provide "draw" in separating the mold parts.

The structure of the strips is the same except that in the structure shown the lattice bar forming grooves in alternate strips are reversely inclined, the grooves of adjacent strips opening into the grooves 16 at substantially opposite points.

The strips 4 also have their corners beveled at the sides of the faces opposite the molding faces as at 25 forming grooves 26 extending the lengths of the strips and communicating with the passages 27 and 28 passing to the outer edges of the plate. As before stated, the strips 4 are secured by the screws 5 and they are so proportioned and located that there are very small clearances 29 between them forming passages from the grooves 16 to the grooves 26. These clearances with their connected grooves and passages form vents to the outside of the mold permitting escape of the air before the incoming metal thereby preventing the formation of air spaces in the mold which might exclude the metal from portions of the mold and result in an imperfect casting.

The clearances 29 are very narrow so that no material amount of the poured metal will enter them to any considerable degree. A width of two or three thousandths of an inch has given good results.

The other mold part is illustrated in Figs. 5, 6 and 7 and is similar to that just described, having the plate 1' with the central channel and the raised end heads 2' and 3', the ends of the channel being closed by bars, the bar 7' having the tapered pouring recess 8' and the grooves 9' communicating with the grid forming passages. Similarly it has the strips 4' carrying the inclined V shaped grooves 13' for the lattice bars in depressed faces 10', elevated faces 11' being carried on projections 12' extending from between the depressed faces. Also the strips are beveled to form the grooves 16' extending between the groove 17' for the top and the groove 18' for the bottom of the grid frame, the grooves 19' and 20' for forming the sides of the grid frame extending between the grooves 17' and 18'. Also in a manner similar to that described in connection with the other mold part, the bottoms of the strips 4' are beveled at the corners to form grooves 26' communicating with passages 27' and 28' in the end heads and forming with the clearances 29' between the strips, air vents for the mold. Also a channel 21' is cut in the end head 2'. This channel opens into the groove 17' and is for forming the terminal lug. Its end is closed by the plug 22'. Also, like in the other mold part, the lattice bar grooves 13' are so inclined that the corners of the projections 12' are cut away at the ends of the grooves as at 23' and 24', the lattice bar grooves of alternate groups are reversely inclined, open into the V shaped grooves 16' at substantially opposite points and have their bottoms in substantially the same plane with those of the grooves 16'.

The structure of strip face is most clearly shown in the enlarged view Fig. 7 showing the upper end of the left hand strip of Fig. 5.

The parts of the mold halves are so relatively arranged that when they are placed together the recesses 8 and 8' register forming a tapered chamber as shown clearly in Fig. 8, for receiving the poured metal and of a length substantially coextensive with a side of the grid. Also the grid frame forming channels 17, 18, 19, 20 and 17', 18', 19', 20' register with each other respectively; also the lug forming channels 21 and 21' register. The grooves 9 and 9' register respectively as do also the grooves 16 and 16'. The projections 12 enter between the projections 12', closely fitting against their sides, and their plane faces 11 close the sides of the grooves 13' in the depressed faces 10' against which they closely fit, the projections 12' fitting between the projections 12 and closing the sides of the grooves 13. The passages thus formed by the grooves 13 and 13' however, open at their ends into the passages formed by the grooves 16 and 16' and, at the sides of the grid, into the grid frame forming passages. The grooves 13 in one of the mold parts are oppositely inclined to the grooves 13' in the other mold part so that their ends are adjacent and the cutting away of the corners as 23 and 24 of the projections form passages between grooves in one mold part and the adjacent grooves in the other mold parts, extending a short distance along them from their ends. These passages are shown at 30 in Fig. 9.

The meeting plane of the faces 11 and 10' and the meeting plane of the faces 10 and 11' are on opposite sides of the center lines of the passages formed by the grooves 16 and 16'. The inclined sides of each of these grooves therefore extend to a greater distance from the center line at the ends of the elevated faces 11 and 11' than at the ends of the depressed faces 10 and 10'. The result is that the depressed faces 10 overhang the grooves as shown at 31 in Fig. 11, on one side of the plane through the center line of the passages while the faces 10' overhang the grooves, as shown at 33 in Fig. 12, on the other side of that plane. The alternate, overhanging faces face in opposite directions and are on opposite sides of the plane of the center lines.

The mold parts are guided and held in suitable registry by dowel pins 34 in one part entering holes 35 in the other part.

Figure 10:
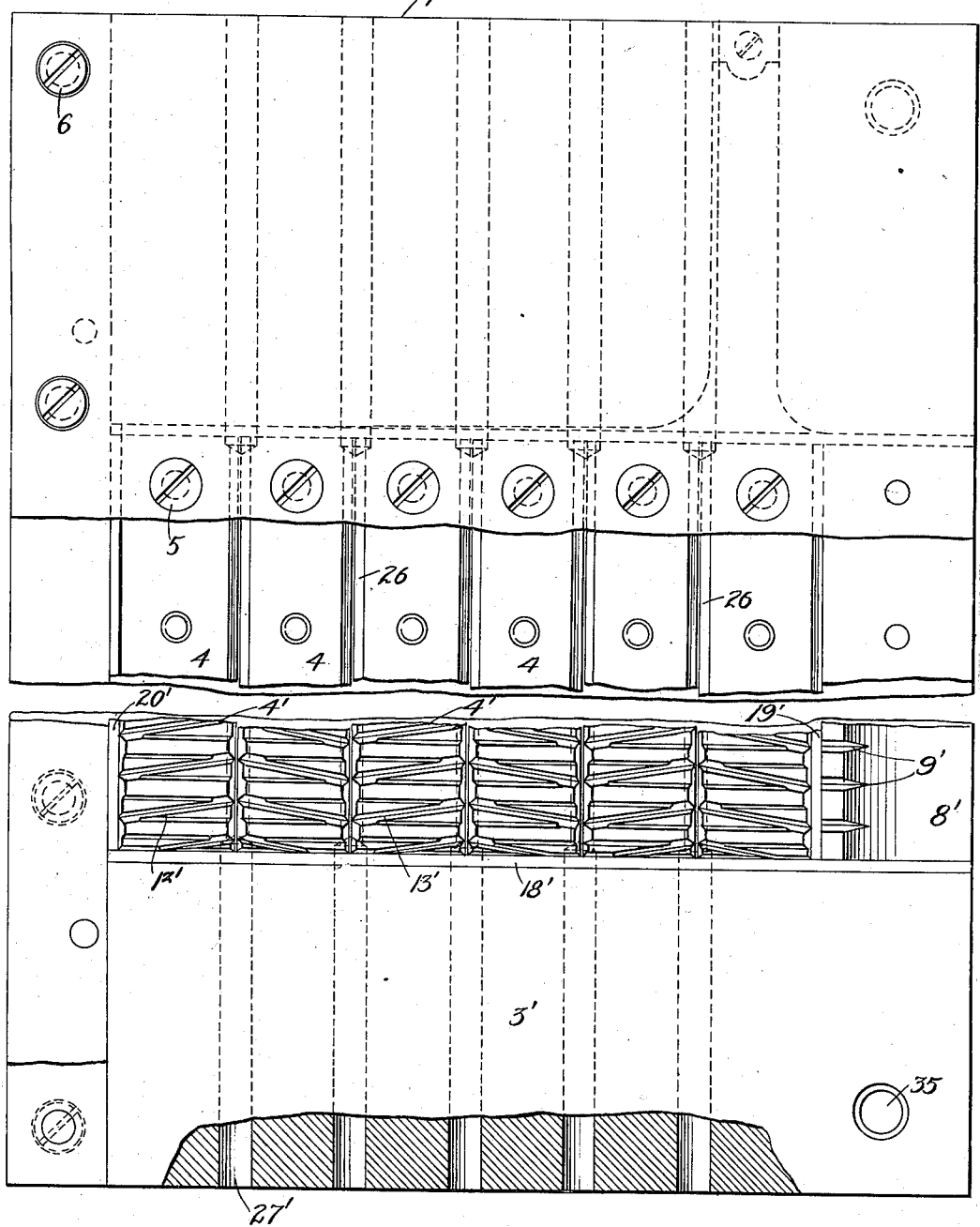
Fig. 10 is a side elevation of the apparatus of Fig. 8 with various parts broken away to show the relations of different portions of the closed mold.

Fig. 10 aids in understanding the relations of the mold parts when closed for molding. At the lower portion of the figure the overlying mold half is broken away and also half of the underlying part, showing the venting passages. Immediately above this the overlying mold part only is removed, showing the face of the underlying mold half. Immediately above this the backing plate only of the overlying mold half is removed showing the strips carrying the mold grooves of the overlying mold half. Above these a face view of the outside of the mold is shown.

The mold parts having been secured in coöperating position, as by the apparatus of Fig. 1, the molten metal is poured into the funnel shaped chamber formed by the recesses 8 and 8' and thence passes through the passages formed by grooves 9 and 9' to the grid forming passages. An integral grid structure as shown in Figs. 13 to 16 is formed comprising the marginal frame formed by the solid top, bottom, and side bars 34, 35, 36, and 37; formed in the passages including the grooves 17, 18, 19, 20, the lug 38 extending from the top bar 34 being formed in the passage formed by the channels 21 and 21'.

Between the top and bottom bars extend the ribs, partitions or spacers 39 located between the lattices. These ribs have a section which is that of a double triangle being formed in the passages composed of the grooves 16 and 16'. As has been noted certain faces overhang these grooves and this results in the formation of the shoulders as 40, 41, on the sides of the grid frame bars and on the sides of the ribs 39, alternate pairs of shoulders along each rib facing in opposite directions and being on opposite sides of the center line of the rib.

The lattice bars as 42 and 42' are of V shaped section and extend between adjacent ribs 39 and the frame and adjacent ribs, being formed in the grooves 13 and 13'. The bars of each row of one lattice, between two adjacent ribs are reversely inclined to those of the other lattice. The ends of the bars of the two lattices are adjacent as shown, and between the adjacent ends are webs 43 extending from the ribs 39 a short distance along the lattice bars, these webs being formed in the passages as 30 formed by cutting away the corners of the projections as before referred to.

In the process of forming the grid, the coöperating molding parts are formed with elevated and depressed faces as 11 and 10 and 11' and 10', the opposed faces of the parts fitting closely together when placed in molding position. After the parts have been thus formed grooves as 13 and 13' for forming the lattice bars are cut in the faces referred to. This manner of formation permits a standard form of blank to be used in which the lattice bar forming grooves may be given any desired size or sectional shape within a wide range and a large variation in the inclination and relationship of the lattice bars may be effected by simply cutting the appropriate grooves in the blank faces. Also the cuts may be made so that strengthening webs may be formed in the desired way or may be left out as dictated by the particular conditions being met. Where the grid is to be of sufficient size, requiring supporting means other than the peripheral frame, between the lattices, grooves as 16 and 16' for forming the partitions as 39 extending between the lattices are formed in the faces of the mold parts. The process of formation is facilitated if each of the coöperating grid forming parts is formed of a series of strips as 4 or 4' having elevated and depressed faces, as before described. This facilitates the cutting of the lattice bar forming grooves. The cutting tool may be run all the way across the strips, without danger of injuring any adjacent parts at the ends of the stroke as would be the case if it were attempted to cut out these grooves with the parts assembled. Also in order to provide the partition forming grooves as 16, the corners of the strips are beveled as before described. The strips are then assembled in a frame so that they will occupy the relative positions as before described. The grid molding parts are then placed together as previously described and the metal poured.

The poured metal having sufficiently solidified in the mold, the mold parts are separated, the projections 12 and 12' occupying the space between the lattices being laterally withdrawn in opposite directions, those attached to one mold part being withdrawn through the openings between the lattice bars of one lattice and those attached to the other mold part being withdrawn through the apertures of the other lattice. The grid is now free to be removed and the lattices are separated by a space occupied in the mold by the projections 12 and 12'.

The grid having been removed, the mold may be closed and the operation repeated.

While one application of the process and apparatus for carrying it out have been set forth in detail it is to be understood that the process is not limited to the precise details enumerated and that it may be carried out by other apparatus than that shown in the drawings.

Having thus described my invention, what I claim as new and desire to secure by Letters Patent is:—

1. The method of forming a double lattice grid for storage batteries, which consists in casting metal in a mold to form a grid having two substantially parallel and separated lattices of inclined bars and withdrawing all of the mold parts from the grid by movement at an angle to the planes of the lattices.

2. The method of forming a double lattice grid for storage batteries, which consists in casting metal in a mold to form a grid having two substantially parallel and separated lattices of inclined bars and withdrawing all of the mold parts from the grid by movement substantially at right angles to the planes of the lattices.

3. The method of forming a double lattice grid for storage batteries, which consists in casting metal in a mold to form a grid having two substantially parallel and separated lattices of inclined bars, said mold comprising material occupying space between the two lattices, and withdrawing the mold parts from the grid, the mold portions between the lattices being withdrawn through the apertures between the bars of a lattice.

4. The method of forming a double lattice grid for storage batteries, which consists in casting metal in a mold to form a grid having two substantially parallel and separated lattices of inclined bars, surrounded by a solid peripheral frame, and withdrawing all of the mold parts from the grid by movement at substantially right angles to the planes of the lattice.

5. The method of forming a double lattice grid for storage batteries, which consists in casting metal in a mold to form a grid having two substantially parallel and separated lattices of inclined bars, said mold comprising material occupying space between the two lattices, and withdrawing the mold parts from the grid, the mold portions between the lattices being partially withdrawn through the apertures in one lattice, and partially withdrawn through the apertures in the other lattice.

6. The method of forming a mold for making a double latticed battery grid which consists in forming blanks having relatively elevated and depressed faces, forming groves in said faces so that there will be two sets of grooves in separated planes when the blanks are placed in coöperative relation and placing the grooved blanks in coöperative relation to form a mold.

7. The method of forming a mold for making a double latticed grid, which consists in forming blanks having relatively elevated and depressed faces, forming grooves in said faces, assembling a plurality of said blanks in a frame to form a mold part, and placing said mold part in coöperating relation with another mold part to form a mold for the grid.

8. The method of forming a mold for making a double latticed battery grid which consists in forming blanks having relatively elevated and depressed faces, forming grooves in said faces, removing metal from the blanks to form partition grooves opening into the aforesaid grooves, said grooves in the completed mold opening into the bar forming grooves for both lattices, and placing the grooved blanks in coöperative relation to form a mold.

9. The method of forming a mold for making a double latticed battery grid which consists in forming blanks having relatively elevated and depressed faces, forming grooves in said faces and beveling said blanks at the ends of said grooves, assembling said blanks in a frame to form a mold part, and placing said mold part in operative relation with another mold part.

10. The method of forming a mold for making a double latticed battery grid which consists in forming a plurality of blanks having relatively depressed and elevated faces, cutting grooves in said faces from side to side of the blanks, beveling the blanks at the ends of the said grooves, assembling the blanks in each of two frames, so that in each frame the bevels form grooves, the grooves thus formed in one mold part registering with the similar grooves in the other mold part and the depressed faces of one mold part engaging the elevated faces of the other mold part when the mold parts are assembled and assembling the mold parts to receive the cast metal to form the grid.

In testimony whereof, I, have signed my name to this specification, this 21st day of August, 1916.

EDWARD F. ANDREAE.